June 15, 1926.
C. R. KRUGER
1,588,591
VEHICLE HEADLIGHT
Filed Sept. 8, 1925
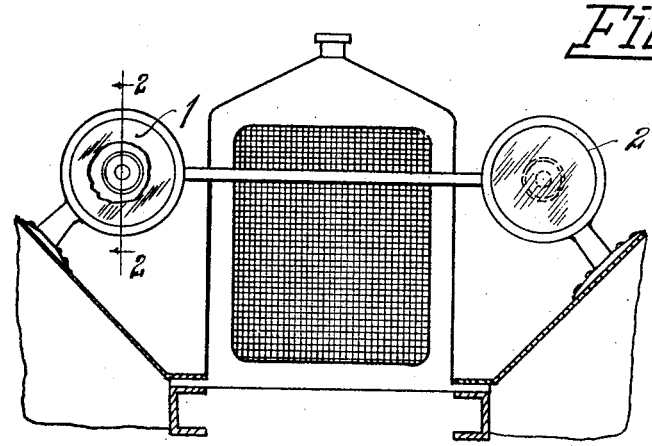
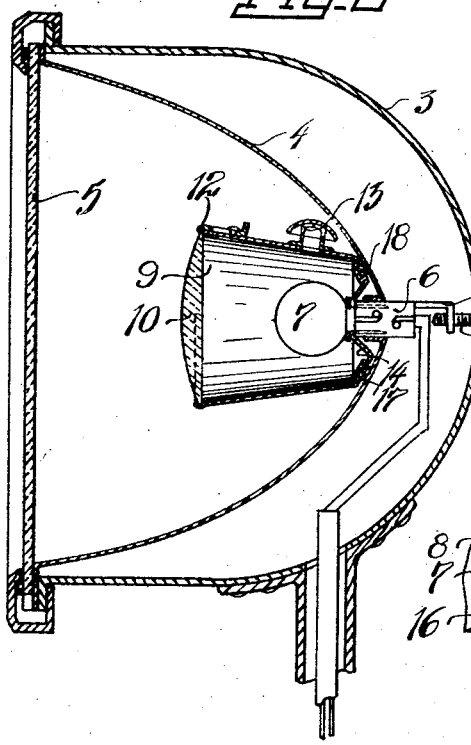
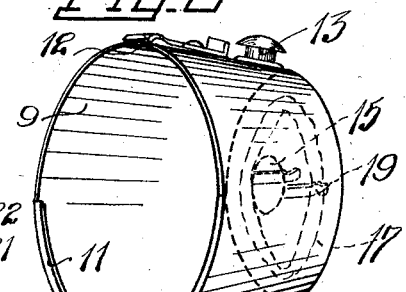
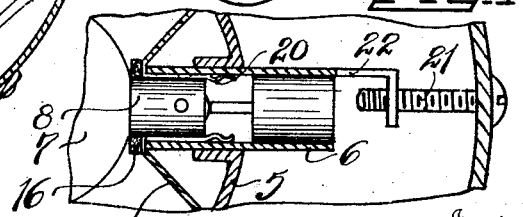
Inventor
Charles R. Kruger
By Herbert E. Smith
Attorney Patented June 15, 1926.

1,588,591

UNITED STATES PATENT OFFICE.

CHARLES R. KRUGER, OF SPOKANE, WASHINGTON.

VEHICLE HEADLIGHT.

Application filed September 8, 1925. Serial No. 54,883.

My present invention relates to improvements in vehicle headlights in the form of an attachment for use either with existing headlights or lamps or for incorporation in the manufactured headlight. The primary object of the invention is the provision of means adapted for use with automobile headlights for the purpose of eliminating the glare usually accompanying the use of such lights and at the same time providing adequate illumination of the roadway or street for safety in driving the vehicle or automobile carrying the lights. By means of the device of my invention which is located within the usual reflector or inner shell of the headlight, the light rays emanating from the lamp are deflected, reflected and refracted in such manner as to break up the usual beam of light for the purpose of eliminating the glare that would otherwise dazzle the vision of the driver of an oncoming car or automotive vehicle, and yet provide sufficient light for travel at night.

The invention consists in certain novel combinations and arrangements of parts with the standard type of headlight, of a detachable light diffusing device capable of attachment by means of the electric bulb within the lamp reflector as will hereinafter be more fully set forth and claimed.

In the accompanying drawings I have illustrated one complete example of the physical embodiment of the device of my invention combined with a headlight according to the best mode I have thus far devised for the practical application of the principles of my invention.

Figure 1 is a view at the front of an automotive vehicle showing a pair of headlights equipped with the device of my invention.

Figure 2 is an enlarged detail sectional view through one of the headlights as at line 2—2 of Figure 1.

Figure 3 is a perspective view of one of the light diffusing devices, detached, with some parts omitted for convenience of illustration.

Figure 4 is an enlarged detail sectional view showing the manner of securing the light diffusing device in the headlight.

To illustrate the general assembly and relation of parts I have shown a pair of headlights 1 and 2 of usual or standard type carried in suitable manner at the front of the automotive vehicle and supplied with electric lighting current in usual manner. Each headlight as usual comprises the outer casing 3 and reflector 4 within the casing and the customary lens 5. The tubular lamp socket 6 may be adjusted to focus the electric light bulb 7 which is provided with any suitable plug 8 for insertion and retention in the lamp socket 6 which is alined with the central longitudinal axis of the lamp casing 3.

The light diffusing device of my invention includes a frusto conical housing 9 in the form of a reflector, preferably made up of metal with an interior reflecting surface of white enamel or other suitable surface, and this housing encloses the electric bulb. The housing is located within the reflector 4 of the headlight and is provided with a lens 10 which is fitted in a grooved, semi-circular flange 11 secured at the front lower edge of the housing. At its upper edge the lens is secured against rattling by means of a flat spring latch 12 carried on the exterior of the housing and adapted to engage over and retain the upper edge of the lens.

To dispose of excess heat generated within the housing from the lamp bulb the housing is provided with a mush-room type of ventilator 13 on the exterior of its top portion. At its rear, the smaller end of the frusto-conical housing is fashioned with an inverted cone shaped bottom or rear wall 14 having a central opening 15. The open center bottom or rear wall of the housing projects toward the front thereof and the wall of the opening is designed to co-act with the front edge of the tubular socket 6 of the headlight. Between the front edge of the socket and the rear portion of the electric bulb an annular gasket 16 is located in the opening 15 of the housing to secure a close cushioned or non-rattling joint for the housing, bulb and socket. The housing is thus retained within the reflector by means of the electric bulb and its plug and the rear wall of the housing is held with a bearing against the surface of the reflector surrounding the lamp plug. For this purpose the rear wall of the housing is fashioned with an annular exterior groove 17 in which a gasket or cushion ring 18 is located for contact with the face of the reflector for the protection of the reflecting surface and to prevent rattling of parts.

The housing is fashioned with a pair of friction tongues or spring fingers 19 19 each having a transverse rib 20. These fingers are of sufficient length to project beyond the end of the lug 8 within the socket 6 when the housing is slipped into place, and it will be apparent that when the plug is slipped into the socket and turned to locked position, neither the lamp bulb nor the housing can work loose within the reflector. The retaining or friction fingers are rigidly held in place by friction between the lamp socket and the lamp plug and as the lamp plug is fastened to the socket, the housing is locked within the socket by means of the ribs 20 at the ends of the lamp plug. By means of the adjusting screw 21 which is threaded into the flanged lug 22 of the lamp socket the latter together with its lamp bulb and the housing are clamped tightly within the rear of the reflector 4.

The presence of the reflecting or light diffusing housing which surrounds the lamp bulb provides an efficient means of breaking up and diffusing the light rays from the lamp bulb and the diffused rays which pass through the lens 10 then pass through the usual lens 5 of the headlight for diffusion and illumination of the area in front of the headlight.

In this manner the usual dazzling light beam is broken up into diffused light rays, the glare is eliminated from the illumination, and yet the illumination is sufficient for the required safety in traveling by night.

Having thus fully described my invention, what I claim as new and desire to secure by Letters Patent is—

1. The combination with a lamp socket, lamp, and lamp plug and reflector of a headlight, of a light diffusing housing surrounding said lamp, and provided with a cone-shaped, open, rear wall, a gasket between said rear wall and the reflector, friction retaining devices on said housing retained between said plug and socket, and means for securing the plug and retaining devices within the socket.

2. The combination with a reflector, a tubular lamp socket therein, an electric lamp and its plug in said socket, of a light diffusing housing having an open rear wall and retaining fingers between said socket and plug, a gasket in the open rear wall between said lamp and socket, and a gasket located in an exterior groove on said rear wall in engagement with the face of said reflector.

In testimony whereof I affix my signature.

CHARLES R. KRUGER.